Dec. 29, 1964  J. H. REES  3,163,251
COMBINED FRAME AND EXHAUST SYSTEM FOR MOTOR VEHICLE
Filed Aug. 8, 1962
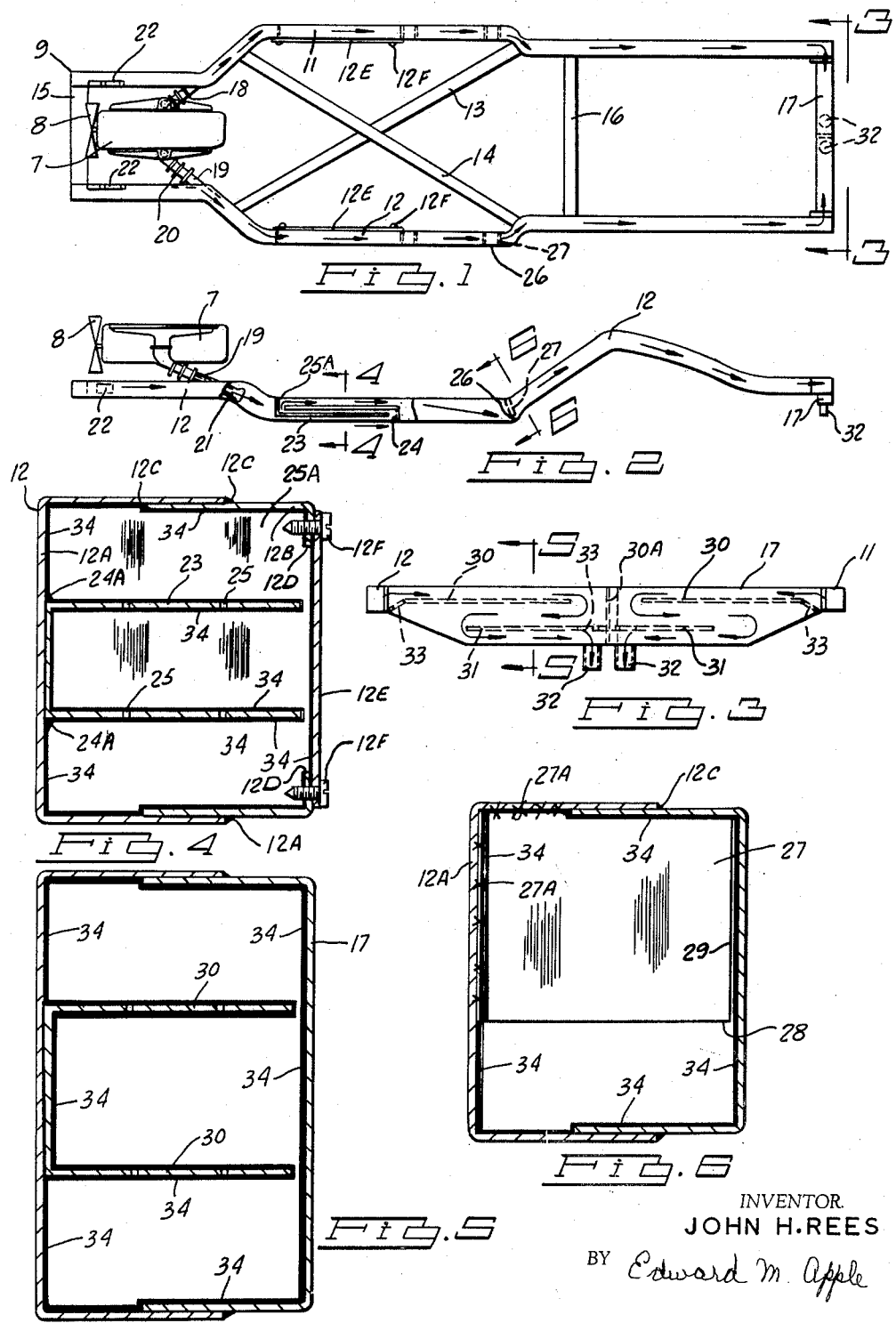
INVENTOR.
JOHN H. REES
BY Edward M. Apple
ATTORNEY

United States Patent Office 3,163,251
Patented Dec. 29, 1964

3,163,251
COMBINED FRAME AND EXHAUST SYSTEM FOR MOTOR VEHICLE
John H. Rees, 1410 Iroquois, Detroit 14, Mich.
Filed Aug. 8, 1962, Ser. No. 215,693
10 Claims. (Cl. 180—64)

This invention relates to internal combustion engine powered automotive vehicles and has particular reference to vehicles of that type which employ a box section frame.

An object of the invention is to combine the box section frame with the exhaust system of the engine, whereby to effect economies in production and assembly, the elimination of parts, and improvement in the performance of the motor vehicle.

Another object of the invention is to provide an integrated exhaust system which should outlast the vehicle and obviate the necessity of making expensive and time consuming replacement of parts and repairs.

Another object of the invention is to provide an exhaust system for an internal combustion engine powered vehicle which is constructed and arranged to effectively dissipate the excessive heat of the exhaust before it has the opportunity of damaging the parts of the exhaust system.

Another object of the invention is to provide an exhaust system in which the damage caused by the condensation of water vapors, and the like, is obviated.

Another object of the invention is to provide an exhaust system which is constructed and arranged so that carbon monoxide and other noxious gases are eliminated from the exhaust.

Another object of the invention is to provide an exhaust system for an internal combustion engine powered vehicle which is constructed and arranged so that the tendency of the exhaust to create "smog" is greatly reduced or entirely obviated.

Another object of the invention is to provide an exhaust system for an internal combustion engine which is constructed and arranged so that it will operate at a more uniform temperature throughout its length.

Another object of the invention is to provide an exhaust system for an internal combustion engine which is constructed and arranged so that the noise factor will be greatly reduced.

Another object of the invention is to improve the manufacturing techniques in the making of a frame and exhaust system, whereby the parts of the exhaust system may readily and inexpensively be insulated against heat and corrosion during the fabricating of the frame.

Another object of the invention is to provide a device of the character indicated which has an exhaust system constructed and arranged with means to draw in fresh air ahead of the connection to the engine.

Another object of the invention is to provide a device of the character indicated which is constructed with a Venturi tube between the engine and the frame.

Another object of the invention is to provide a device of the character indicated which is constructed with a box section frame with integrated baffles to form the muffler.

Another object of the invention is to provide a device of the character indicated, comprising a frame constructed with one or more elements to increase the velocity of the flow of the exhaust gases at locations where there is a tendency for moisture to form by condensation.

The foregoing and other objects and advantages of the invention will become more apparent as the description proceeds, reference being made from time to time to the accompanying drawing forming part of the within disclosure, in which drawing:

FIG. 1 is a plan view of a device embodying the invention.

FIG. 2 is a side elevational view thereof, with parts broken away, to show the position of other parts.

FIG. 3 is an enlarged view taken substantially on the line 3—3 of FIG. 1.

FIG 4. is an enlarged section taken substantially on the line 4—4 of FIG. 2.

FIG. 5 is an enlarged section taken substantially on the line 5—5 of FIG. 3.

FIG. 6 is an enlarged section taken substantially on the line 6—6 of FIG. 2.

Referring now more particularly to the drawing it will be understood that in the embodiment herein disclosed, the reference character 7 indicates the motor, and the reference character 8 indicates the fan of a motor vehicle having a frame 9 which is box-like in cross section, as shown in FIGS. 4, 5 and 6 and which consists of side members 11 and 12 and cross members 13, 14, 15, 16 and 17 which are assembled and secured together by welding, or other suitable means. As shown in FIG. 4, the side member 12 consists of two channel shaped members 12A and 12B which telescopes one into the other and are secured together by welding, as at 12C, to form a box-like structure, which is bent and rebent as shown in FIGS. 1 and 2. The side member 11 is likewise so formed.

It is the purpose of this invention to employ the box-like structure of the side members 11 and 12 as the principal parts of the exhaust system of the motor vehicle as will be explained more particularly hereinafter.

As shown in FIG. 1, both the side members 11 and 12 are employed in the exhaust system of the motor vehicle disclosed, although it is within the contemplation of the invention to employ only one or the other of the side members 11 and 12. In this embodiment, the engine 7 has two exhaust manifolds 18 and 19, the manifold 18 being connected to the side member 11 and the exhaust manifold 19 being connected to the side member 12. Each manifold 18 and 19 is provided with air cooling fins 20 which dissipate a considerable portion of the heat from the exhaust gases before the gases enter the side members 11 and 12.

Each exhaust manifold 18 and 19 communicates with the interior of a side member 11 and 12 through a Venturi tube 21, as shown in FIG. 2. This tends to accelerate the velocity of the exhaust gases as they enter the frame member 12. The same is true of the member 11. It siphons fresh air into the member 12 through the fresh air ports 22 formed in the side members 11 and 12. The flow of the fresh air entering the openings 22 is increased by the action of the cooling fan 8. The fresh air drawn into the members 11 and 12 through the fresh air ports 22 travels in the direction shown by the arrows in FIG. 2 and swirls around the end of the Venturi tube 21 and mixes with the exhaust gases from the exhaust manifolds 18 and 19, further helping to cool and dilute the exhaust gases. The fresh air also reduces and neutralizes the carbon monoxide content in the gases and neutralizes the other elements in the gases which help in the creation of "smog."

As the cooled, diluted and neutralized gases continue their travel through the members 11 and 12, they encounter noise deadening elements 23 (FIG. 4) which in this embodiment consist of a U-shaped member which is welded, as at 24A, to the member 12A comprising part of the side member 12. The legs of the member 23 are apertured, as at 25, to permit some of the gases to pass therethrough. Each end of the member 23 is provided with a baffle, as at 24 and 25A, which cause the gases to travel in a tortuous path through the member 23, as shown by the arrows in FIG. 2. The baffle 25A is perforated to permit the direct passage of some of the gases passing through the member 23. The member 23 is placed in the side member 12 through a cutout portion 12D, which cutout portion is closed by means of a plate 12E, which is secured in position by meanas of metal screws 12F, or other suitable means.

By the time the gases have passed through the member 23, the noise factor has been greatly reduced. At point 26 (FIGS. 2 and 6), the gases encounter a baffle plate 27 which is welded, as at 27A, to the side member 12A. The exhaust gases are permitted to pass around the end 28 and around the side 29 of the baffle 27. This restriction to the flow of the exhaust gases is sufficient to increase the velocity of the gases and helps to scavenge the area and to obviate any tendency for moisture to collect at this point. This is an important feature of the invention, as it prevents the collection of moisture in the system which has a deleterious and corrosive effect on the parts.

The exhaust gases continue their travel through the member 12 and may be exhausted through suitable openings (not shown) in the ends of the members 11 and 12, or may be continued into the cross member 17, as shown in FIG. 3, where they encounter further muffling action by reason of their travel through and around the apertured plates 30 and 31 (FIG. 3) and their impact against the baffle 30A. The plates 30 and 31 are apertured, as at 33, to permit some of the gases to pass therethrough and to permit drainage of any moisture which might condense within the member 17. The gases are then quietly discharged through the exhaust openings 32 into the atmosphere, free of carbon monoxide and other deleterious substances which create "smog" and the like.

It will be understood that each of the inside faces of the members 11 and 12 is coated with a ceramic, or other lining material 34, which will prevent the corrosion of the metal comprising the frame members by the exhaust gases passed therethrough, and will insulate the members 11 and 12 from any residual heat in said gases.

It is believed that the operation of the device is obvious from the foregoing description.

Having described my invention, what I claim and desire to secure by Letters Patent is:

1. In an automotive vehicle having a box section frame and an internal combustion engine, including a fan, the combination of an exhaust system for said engine housed substantially within the confines of said box section frame, the interior of said frame communicating with the interior of said engine through a manifold and a Venturi tube, there being a fresh air port in said frame ahead of the connection of said tube to said frame, and there being a space around a portion of the exhaust end of said tube for the passage of fresh air from said last named port.

2. In an automotive vehicle, having a box section frame, and an internal combustion engine, including a fan, the combination of an exhaust system for said engine housed substantially within the confines of said box section frame, the interior of said frame communicating with the interior of said engine through a manifold, there being a fresh air port in said frame, in communication with the interior of said frame near the leading end of said frame, and ahead of the place of communication of said manifold with the interior of said frame, whereby fresh air entering the interior of said frame through said port, passes rearwardly on the interior of said frame and mixes with the exhaust gases entering said frame whereby to cool and dilute said gases.

3. The structure of claim 2, in which said fresh air port is positioned in said frame adjacent to said fan, and is arranged to receive air from said fan, and direct it rearwardly through said box section frame.

4. The structure of claim 2, there being sound muffling means comprising apertured baffles on the interior of said frame, and directly supported by the walls of said frame.

5. The structure of claim 2, there being at least one element secured on the interior wall of said frame for increasing the velocity of gases flowing through the interior of said frame.

6. The structure of claim 2, there being perforated means on the interior walls of said frame for changing the direction of flow of the fresh air and gases on the interior.

7. The structure of claim 2, including means on the interior of said frame for preventing the corrosion of the metal of said frame by the fresh air and gases passing through said frame.

8. The structure of claim 2, including insulating means on the interior walls of said frame for preventing the transfer of heat to said frame from the hot gases passing through said frame.

9. The structure of claim 2, there being apertured baffles secured to the walls of said frame, and at least one side opening in said frame adjacent said baffles, and a removable plate for closing said opening.

10. The structure of claim 2, in which said box section frame has a cross member at the rear thereof, and having its interior in communication with the interior of said frame, said cross member having baffles therein supported by the walls of said cross member, there being at least one exhaust port in said cross member.

References Cited in the file of this patent

UNITED STATES PATENTS

| | | |
|---|---|---|
| 792,804 | Williams | June 20, 1905 |
| 1,856,005 | Tomshow | Apr. 26, 1932 |
| 2,078,420 | Sheldrick | Apr. 27, 1937 |
| 2,121,504 | Martin | June 21, 1938 |
| 2,138,001 | Fluor | Nov. 29, 1938 |
| 2,875,841 | Henderson | Mar. 3, 1959 |
| 2,958,388 | Paulsen | Nov. 1, 1960 |
| 2,975,072 | Bryant et al. | Mar. 14, 1961 |

FOREIGN PATENTS

| | | |
|---|---|---|
| 531,478 | Italy | Aug. 2, 1955 |
| 743,439 | Germany | Dec. 27, 1943 |